US008353778B2

(12) United States Patent
Miao et al.

(10) Patent No.: US 8,353,778 B2
(45) Date of Patent: Jan. 15, 2013

(54) FORGING METHOD, CLOSED FORGING MOLD AND TRIPOD UNIFORM MOTION UNIVERSAL JOINT

(75) Inventors: Jiahua Miao, Iwata (JP); Akira Sera, Iwata (JP); Shunsuke Makino, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/129,648

(22) PCT Filed: Nov. 30, 2009

(86) PCT No.: PCT/JP2009/070104
§ 371 (c)(1),
(2), (4) Date: May 17, 2011

(87) PCT Pub. No.: WO2010/073877
PCT Pub. Date: Jul. 1, 2010

(65) Prior Publication Data
US 2011/0224004 A1    Sep. 15, 2011

(30) Foreign Application Priority Data

Dec. 22, 2008    (JP) ................................. 2008-325943

(51) Int. Cl.
*F16D 3/205* (2006.01)
*B21D 22/02* (2006.01)
(52) U.S. Cl. .................. 464/111; 464/905; 72/353.2
(58) Field of Classification Search ................ 464/111, 464/123, 124, 905; 72/353.2
See application file for complete search history.

(56) References Cited

U.S. PATENT DOCUMENTS

| 4,971,595 | A  | * | 11/1990 | Sasaki et al. ............... 464/111 |
| 6,298,556 | B1 | * | 10/2001 | Stall et al. ................ 464/111 X |
| 7,217,194 | B2 | * | 5/2007  | Goto et al. ................. 464/111 |
| 7,922,590 | B2 | * | 4/2011  | Pallante .................... 464/905 |
| 2004/0048676 | A1 | * | 3/2004 | Fujii ........................ 464/111 |
| 2008/0184765 | A1 | * | 8/2008 | Jiahua et al. ................ 72/360 |

FOREIGN PATENT DOCUMENTS

| EP | 169091    | * | 1/1986  |
| EP | 296025    | * | 12/1988 |
| EP | 2 141 375 |   | 1/2010  |
| GB | 2226102   | * | 6/1990  |

(Continued)

OTHER PUBLICATIONS

International Search Report issued Jan. 12, 2010 in International (PCT) Application No. PCT/JP2009/070104.

(Continued)

*Primary Examiner* — Gregory Binda
*Assistant Examiner* — Josh Skroupa
(74) *Attorney, Agent, or Firm* — Wenderoth, Lind & Ponack, L.L.P.

(57) ABSTRACT

A forging method and a full-enclosed forging die contribute to the alleviation of an enclosing force applied to dies and in which a relatively small enclosing apparatus can be used even with respect to larger-sized products. A tripod type constant velocity universal joint is formed with a tripod member molded with the full-enclosed forging die. The full-enclosed forging die includes openable/closable dies and punches for pressing a material between the dies. From the forging die, the tripod member including a boss portion and shaft portions protruded radially from the boss portion is molded.

5 Claims, 5 Drawing Sheets

FOREIGN PATENT DOCUMENTS

| | | | |
|---|---|---|---|
| JP | 07091457 | * | 4/1995 |
| JP | 2003-343592 | | 12/2003 |
| JP | 2006-183725 | | 7/2006 |
| JP | 2008-240825 | | 10/2008 |
| WO | 2008/117612 | | 10/2008 |

OTHER PUBLICATIONS

International Preliminary Report on Patentability and Written Opinion of the International Searching Authority issued Jul. 14, 2011 in International (PCT) Application No. PCT/JP2009/070104.

* cited by examiner

FORGING METHOD, CLOSED FORGING MOLD AND TRIPOD UNIFORM MOTION UNIVERSAL JOINT

TECHNICAL FIELD

The present invention relates to a forging method, a full-enclosed forging die, and a tripod type constant velocity universal joint.

BACKGROUND ART

In order to form, through full-enclosed forging, a product including a boss portion radially provided with shaft portions, such as a trunnion (tripod member) for constant velocity universal joints and a cross spider for universal joints, a full-enclosed forging die is used.

The full-enclosed forging die is described in Patent Literature 1 or the like, and as illustrated in FIG. 7, includes openable/closable dies 1 and 2 and punches 4 and 5 arranged so as to be operable on a central axis of the dies 1 and 2. Specifically, through pressing with the punches 4 and 5 under a state in which the dies 1 and 2 are closed, a cavity 9 is formed, which corresponds to shapes of shaft portions 7 and a boss portion 8 of a product 6. Thus, a billet (material) is put into the dies, and then clamping is performed. After that, the billet is pressed with the punches 4 and 5 so as to be plastically deformed. As a result, as illustrated in FIG. 8, the product 6 can be formed, which is provided with the boss portion 8 and the shaft portions 7.

Citation List
Patent Literature
[PTL 1] JP 2003-343592 A

SUMMARY OF INVENTION

Technical Problem

In the through full-enclosed forging as described above, with use of an enclosing apparatus using a hydraulic pressure, a spring, or the like, an enclosing force is applied so as to maintain the upper and lower dies to be held in contact with each other. Thus, a required enclosing force becomes higher in accordance with an increase in size of an object product. In some cases, the enclosing apparatus is used with a rated enclosing force at an upper limit. However, use with the rated enclosing force at an upper limit causes a life of the enclosing apparatus to be shortened. Further, in order to mold a larger-sized product requiring a higher enclosing force, an enclosing apparatus capable of applying a desired large enclosing force has to be used. In accordance therewith, a press machine becomes larger and cost thereof increases.

In view of the above-mentioned problems, the present invention has been made to provide a forging method and a full-enclosed forging die which contribute to alleviation of the enclosing force applied to the dies and in which a relatively small enclosing apparatus can be used even with respect to larger-sized products. Further, the present invention has been made to provide a tripod type constant velocity universal joint using a tripod member molded with such a full-enclosed forging die.

Solution to Problem

A forging method according to the present invention, in which a full-enclosed forging die including openable/closable dies and punches for pressing a material between the openable/closable dies is used so that a product including a boss portion and shaft portions protruded radially from the boss portion is molded, includes making a projection area in a boss-portion axial direction toward a die side of the boss portion smaller than another projection area in the boss-portion axial direction toward the die side, the another projection area being defined when a radially outer surface is formed as a single convex curved surface about a boss-portion axial center. In this case, each of the projection area and the another projection area represents an area of a projection portion (area from which an actual area of any one of end surfaces of the boss portion is omitted) on a plane including the any one of the end surfaces, the projection portion being obtained by projection of a boss-portion radially outer portion onto the plane.

According to the forging method of the present invention, the projection area can be reduced in the boss-portion axial direction toward the die side of the boss portion, and hence perpendicular (boss-portion axial direction) load which acts on the dies during full enclosure can be reduced.

By forming the radially outer surface of the boss portion as a surface including a first flat-surface portion, a convex curved-surface portion, a tapered-surface portion, a concave curved-surface portion, and a second flat-surface portion formed in the stated order from an axial central portion, the projection area can be reduced. In this case, it is preferred that the tapered-surface portion be a tangent with respect to the convex curved-surface portion. Further, it is preferred that a taper angle of the tapered-surface portion be set to 25° or less. In addition, the tapered-surface portion may be a tangent with respect to the concave curved-surface portion. The first flat-surface portion may be a tangent with respect to the convex curved-surface portion, and may be a surface parallel to an axial direction. The second flat-surface portion may be a tangent with respect to the concave curved-surface portion, and may be a surface parallel to the axial direction.

A full-enclosed forging die according to the present invention includes openable/closable dies, and punches for pressing a material between the openable/closable dies so that a product including a boss portion and shaft portions protruded radially from the boss portion is molded, in which, in the boss portion of the product to be molded, a projection area in a boss-portion axial direction toward a die side is made to be smaller than another projection area in the boss-portion axial direction toward the die side, the another projection area being defined when a radially outer surface of the boss portion is formed as a single convex curved surface about a boss-portion axial center.

According to the full-enclosed forging die of the present invention, the projection area at the time of molding can be reduced in the boss-portion axial direction toward the die side of the boss portion, and hence the perpendicular (boss-portion axial direction) load which acts on the dies during full enclosure can be reduced.

A tripod type constant velocity universal joint according to the present invention includes: an outer joint member having an inner peripheral surface provided with three linear track grooves extending in an axial direction; a tripod member arranged in the outer joint member and including three leg shafts protruded radially from a boss portion and a radially outer surface of the boss portion; and torque transmitting elements supported respectively by the three leg shafts and guided respectively by the three linear track grooves, the tripod member being molded with a full-enclosed forging die including openable/closable dies and punches for pressing a material between the openable/closable dies, in which a projection area in a boss-portion axial direction toward a die side of the boss portion of the tripod member is made to be smaller than another projection area in the boss-portion axial direction toward the die side, the another projection area being defined when a radially outer surface is formed as a single convex curved surface about a boss-portion axial center.

According to the tripod type constant velocity universal joint of the present invention, in the dies of the full-enclosed forging die used at the time of molding of the tripod member, the perpendicular (boss-portion axial direction) load which acts on the dies during full enclosure can be reduced.

It is preferred that the radially outer surface of the boss portion be formed as a surface including a first flat-surface portion, a convex curved-surface portion, a tapered-surface portion, a concave curved-surface portion, and a second flat-surface portion formed in the stated order from an axial central portion. Further, it is preferred that the tapered-surface portion be a tangent with respect to the convex curved-surface portion, and a taper angle of the tapered-surface portion be set to 25° or less. In addition, the tapered-surface portion may be a tangent with respect to the concave curved-surface portion. The first flat-surface portion may be a tangent with respect to the convex curved-surface portion, and may be a surface parallel to an axial direction. The second flat-surface portion may be a tangent with respect to the concave curved-surface portion, and may be a surface parallel to the axial direction.

It is preferred that each of the torque transmitting elements include: an outer roller inserted into corresponding one of the three linear track grooves of the outer joint member; and an inner roller externally fitted to corresponding one of the three leg shafts so as to be arranged on an inner peripheral side of the outer roller. Further, it is preferred that each of the three leg shafts has such a straight shape as to be orthogonal to an axial line of the tripod type constant velocity universal joint in vertical cross-section, and be held in contact with an inner peripheral surface of the inner roller in a direction orthogonal to the axial line of the tripod type constant velocity universal joint in lateral cross-section. Further, it is preferred that, in an axial-line direction of the tripod type constant velocity universal joint, a gap be formed between each of the three leg shafts and the inner peripheral surface of the inner roller.

With this structure, without loss of torque transmitting property, when rotation is made while the outer joint member and the joint inner member (tripod member) form an operating angle, the roller and the roller-guide surfaces can be more effectively avoided from entering an oblique state. Note that, the structure can be obtained, for example, through formation of a lateral sectional shape of each of the three leg shafts into such a substantially elliptical shape as to have a long axis in the direction orthogonal to the axial line of the tripod type constant velocity universal joint.

Advantageous Effects of Invention

In the present invention, the perpendicular (boss-portion axial direction) load which acts on the dies during full enclosure can be reduced. With this, a small and simple enclosure apparatus (apparatus for enclosing dies) can be used, and hence press-equipment cost can be saved. Further, load on the enclosure apparatus can be alleviated, and hence a life of the enclosure apparatus can be prolonged.

The radially outer surface of the boss portion is formed as the surface including the first flat-surface portion, the convex curved-surface portion, the tapered-surface portion, the concave curved-surface portion, and the second flat-surface portion formed in the stated order from the axial central portion. Thus, the above-mentioned projection area can be reduced. Thus, the perpendicular load which acts on the dies during full enclosure can be reliably reduced.

Further, in the tripod type constant velocity universal joint according to the present invention, the tripod member is used which is molded with use of the full-enclosed forging die according to the present invention and by the forging method according to the present invention. Thus, press-equipment cost of the full-enclosed forging die used for manufacture of the tripod type constant velocity universal joint can be saved. Further, the load on the enclosure apparatus can be alleviated, and hence the life of the enclosure apparatus can be prolonged.

In addition, through formation of the lateral sectional shape of each of the three leg shafts into such a substantially elliptical shape or the like as to have the long axis in the direction orthogonal to the axial line of the tripod type constant velocity universal joint, the roller and the roller-guide surfaces of each of the three linear track grooves can be effectively avoided from entering an oblique state. As a result, skid resistance during operating-angle driving can be reduced. Thus, in vehicles using such constant velocity universal joints, it is possible to suppress phenomena such as vehicle-body vibration and noise which are caused by an increase in friction, and hence to maintain stable vibration property of the vehicles.

DETAILED DESCRIPTION OF THE INVENTION

In the following, description is made of an embodiment of the present invention with reference to FIGS. 1 to 8.

Figure 1:
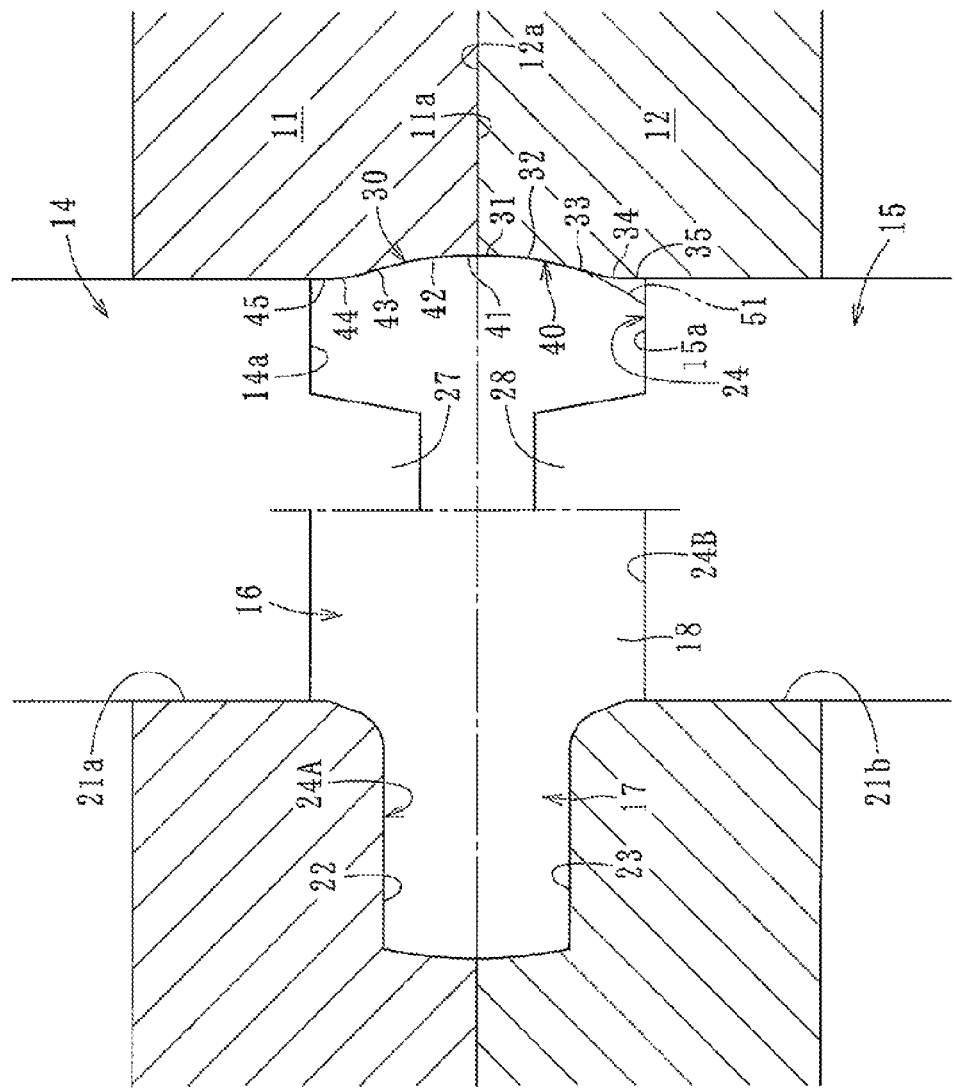
[FIG. 1] A sectional view of a full-enclosed forging die illustrating an embodiment of the present invention.

FIG. 1 illustrates a full-enclosed forging die according to the present invention. The full-enclosed forging die includes openable and closable dies 11 and 12 and punches 14 and 15 driven along an opening/closing direction of the dies 11 and 12 so as to press a material in the dies 11 and 12. The full-enclosed forging die molds a product (for example, a tripod member for constant velocity universal joints) 16 radially provided with shaft portions 17. Note that, the tripod member as the product 16 includes a boss portion 18 and the three shaft portions 17 extending radially outward from the boss portion 18.

Guide holes 21a and 21b are provided at respective axial portions of the dies 11 and 12, and the punches 14 and 15 are fit-inserted respectively into the guide holes 21a and 21b. Further, at an opening portion of each of the guide holes 21a and 21b on respective mating-surface-11a-and-12a sides of the dies 11 and 12, there are respectively arranged three recessed portions 22 and 23 along circumferential directions at pitches of 120° while extending in radial directions.

Still further, a swelling portion 27 is provided at a central portion of a lower surface 14a of the upper punch 14, and a swelling portion 28 is provided at a central portion of an upper surface 15a of the lower punch 15.

Under a state in which the dies 11 and 12 are superimposed on each other as illustrated in FIG. 1, shaft-portion spaces 24A for forming the shaft portions 17 of the product 16 are formed of the recessed portions 22 and 23 facing each other. Further, a boss-portion space 24B for molding the boss portion 18 is formed of the punches 14 and 15 and the dies 11 and 12. That is, a cavity 24 for product molding is constituted by the shaft-portion spaces 24A and the boss-portion space 24B.

Figure 2:
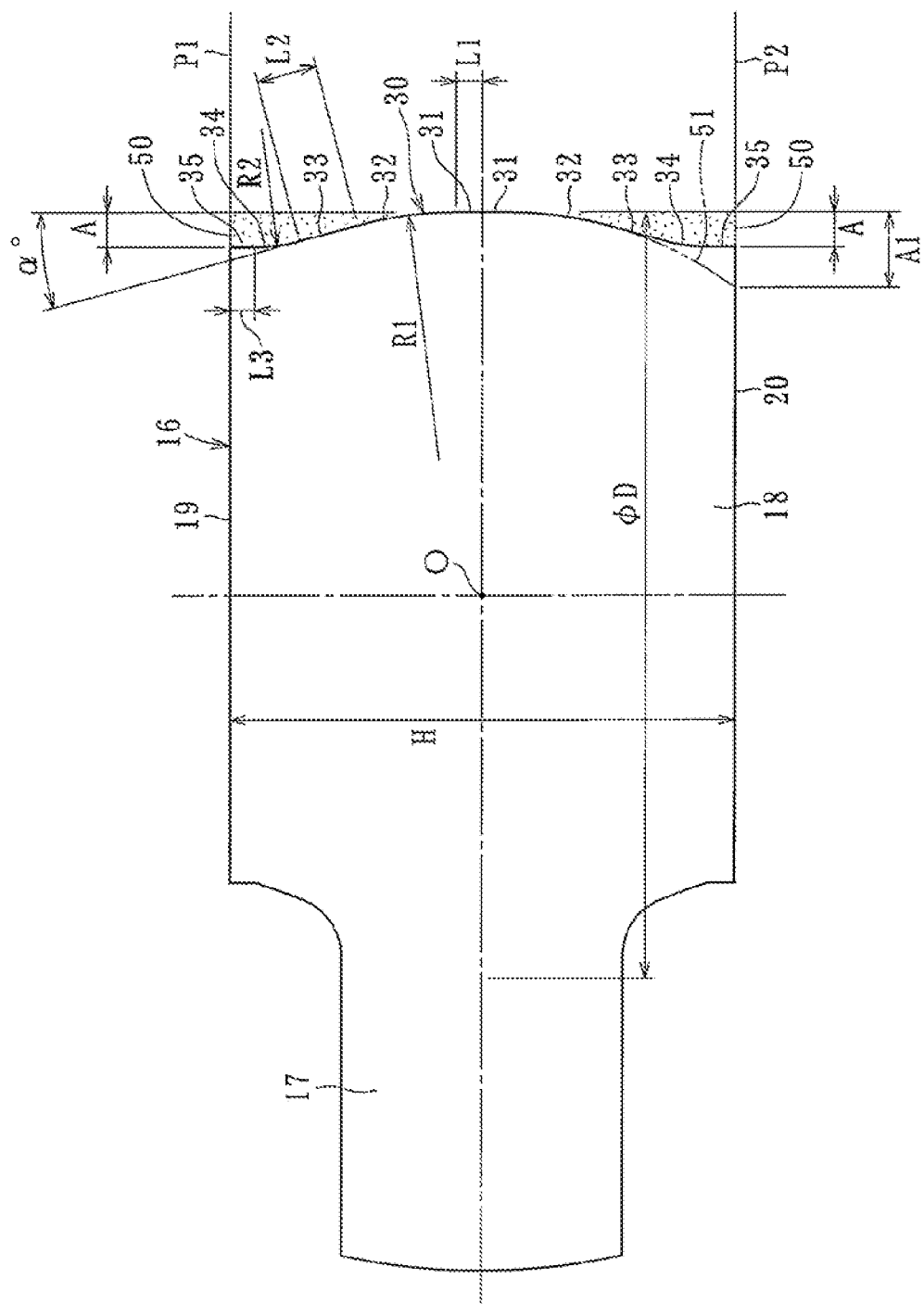
[FIG. 2] A main-part outline view of a product molded with the full-enclosed forging die.

By the way, as illustrated in FIG. 2, on a radially outer surface 30 of the boss portion 18 of the product 16, there is formed a surface including a first flat-surface portion 31, a convex curved-surface portion 32, a tapered-surface portion 33, and a concave curved-surface portion 34 in the stated order from an axial central portion. In addition, a second flat-surface portion 35 is provided at an axial end portion of the concave curved-surface portion 34.

In this case, the first flat-surface portion 31 is a surface parallel to an axial direction, and is a flat surface in a tangential direction with respect to the convex curved-surface portion 32. The convex curved-surface portion 32 is a curved surface having a curvature center positioned on a radially inner side relative to the radially outer surface 30. The tapered-surface portion 33 is a flat surface in a tangential direction with respect to the convex curved-surface portion 32, and is a flat surface in a tangential direction with respect to the concave curved-surface portion 34. The concave curved-surface portion 34 is a curved surface having a curvature center positioned on a radially outer side relative to the radially outer surface 30. The second flat-surface portion 35 is a surface parallel to the axial direction, and is a flat surface in a tangential direction with respect to the concave curved-surface portion 34.

For example, in the boss portion 18, when a thickness H is set to 28 mm, a diameter dimension ØD is set to 44 mm, and a curvature radius R1 of the convex curved-surface portion 32 is set to 22 mm, it is possible to set a dimension L1 of the first flat-surface portion 31 to 1 mm, a taper angle α of the tapered-surface portion 33 to 25°, a dimension L2 of the tapered-surface portion 33 to 2 mm, a curvature radius R2 of the concave curved-surface portion 34 to 3 mm, and a dimension L3 of the second flat-surface portion 35 to 0.6 mm.

In other words, as illustrated in FIG. 1, on a boss-portion-outer-diameter molding surface 40 in the cavity 24 of the full-enclosed forging die, there are formed a first flat-surface portion 41, a convex curved-surface portion 42, a tapered-surface portion 43, a concave curved-surface portion 44, and a second flat-surface portion 45. At the time of molding, the radially outer surface 30 of the boss portion 18 is finished as the surface including the first flat-surface portion 31, the convex curved-surface portion 32, the tapered-surface portion 33, the concave curved-surface portion 34, and the second flat-surface portion 35.

Next, description is made of a forging method with use of the above-mentioned die. First, the upper die 11 and the lower die 12 are brought into such a die-open state as to be separated relatively to each other. In this case, the upper punch 14 is raised and the lower punch 15 is lowered. In this state, the billet (material) is put into the guide hole 21b of the lower die 12. Note that, the billet can be fit-inserted into the guide holes 21a and 21b, and corresponds to a volume of a product to be formed.

After that, clamping is performed so as to bring the upper die 11 and the lower die 12 close relatively to each other. Next, the upper punch 14 is lowered, and simultaneously the lower punch 15 is raised. With this, the above-mentioned spaces 24A are formed in which the billet is pressed from above and below so that the shaft portions 17 are formed. A part of the billet is fluidized in the spaces 24A so that the product 16 (tripod member) including the three shaft portions 17 radially around the boss portion 18 is formed.

Figure 3:
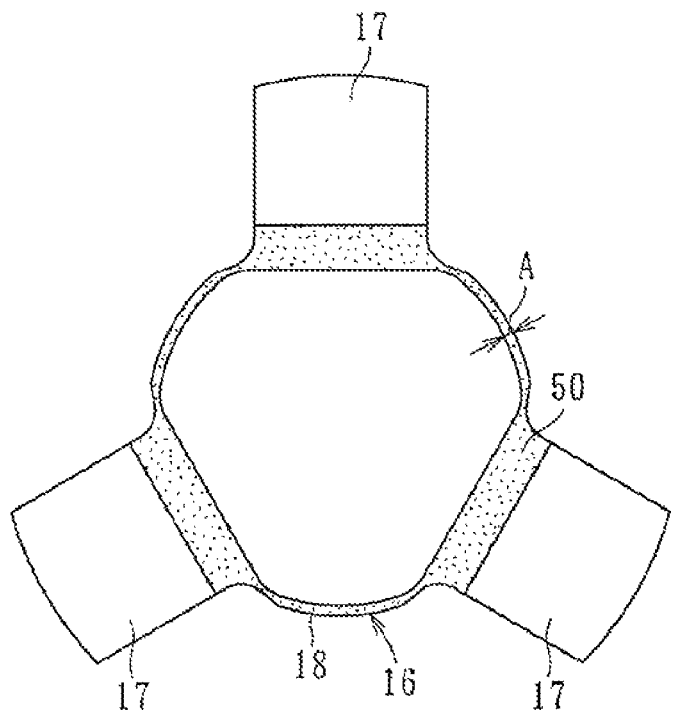
[FIG. 3] A plan view of the product molded with the full-enclosed forging die.

By the way, a projection portion 50 in the boss-portion axial direction toward a die side of the boss portion 18 corresponds to a range illustrated by dots (dotted patterns) in FIG. 3. Meanwhile, when the radially outer surface of the boss portion 18 is formed as a single convex curved surface 51 (curved surface illustrated by an imaginary line in FIG. 2) about a boss-portion axial center, the projection portion 50 in this case corresponds to a range illustrated by dots (dotted patterns) in FIG. 4. Here, the projection portion 50 represents a projection portion (part except the end surface 19 or 20) obtained by projection of a boss-portion radially outer portion onto a plane (P1, P2) including any one of end surfaces 19 (20) of the boss portion 18.

Figure 4:
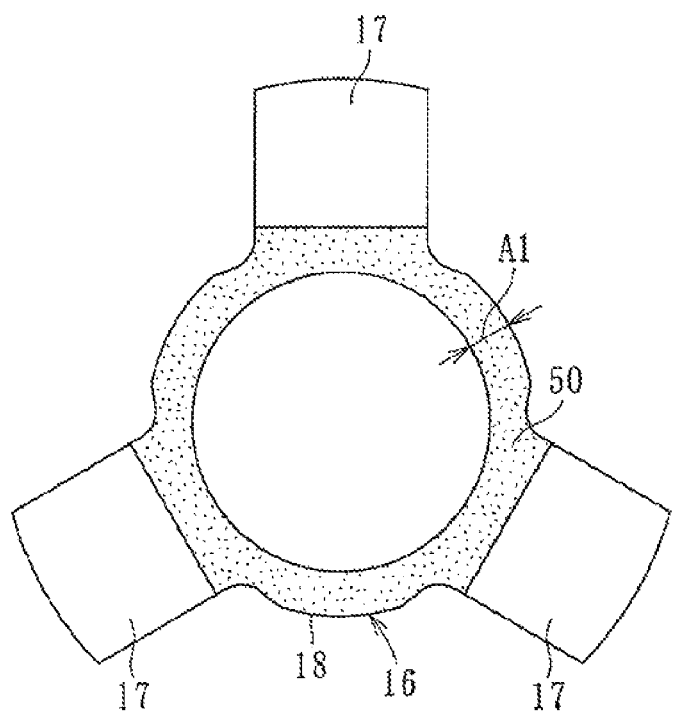
[FIG. 4] A plan view of the product having a large projection area.

In comparison between FIGS. 3 and 4, in FIG. 3, in the boss portion 18 between the shaft portions 17 and 17 adjacent to each other, the projection portion 50 has a radial length A. In FIG. 4, in the boss portion 18 between the shaft portions 17 and 17 adjacent to each other, the projection portion 50 has a radial length A1. In this case, A1 is larger than A.

In other words, in the present invention, as illustrated in FIG. 3, a projection area can be reduced in the boss-portion axial direction toward the die side of the boss portion 18. This is because, as described above, the radially outer surface 30 of the boss portion 18 of the product 16 includes the first flat-surface portion 31, the convex curved-surface portion 32, the tapered-surface portion 33, and the concave curved-surface portion 34. The projection area represents an area of the projection portion (area from which an area of the end surface 19 or 20 of the boss portion 18 is omitted) on the plane P1 (P2) including any one of the end surfaces 19 (20), the projection portion being obtained by projection of the boss-portion radially outer portion onto the plane.

In the present invention, the projection area can be reduced in the boss-portion axial direction toward the die side of the boss portion 18, and hence perpendicular (boss-portion axial direction) load which acts on the dies 11 and 12 during full enclosure can be reduced. Accordingly, a small and simple enclosure apparatus (apparatus for enclosing dies) can be used, and hence press-equipment cost can be saved. Further, load on the enclosure apparatus can be alleviated, and hence a life of the enclosure apparatus can be prolonged.

The radially outer surface 30 of the boss portion 18 is formed as the surface including the first flat-surface portion 31, the convex curved-surface portion 32, the tapered-surface portion 33, and the concave curved-surface portion 34 formed in the stated order from the axial central portion. Thus, the projecting area can be reduced. Thus, the perpendicular load which acts on the dies 11 and 12 during full enclosure can be reliably reduced.

Figure 5:
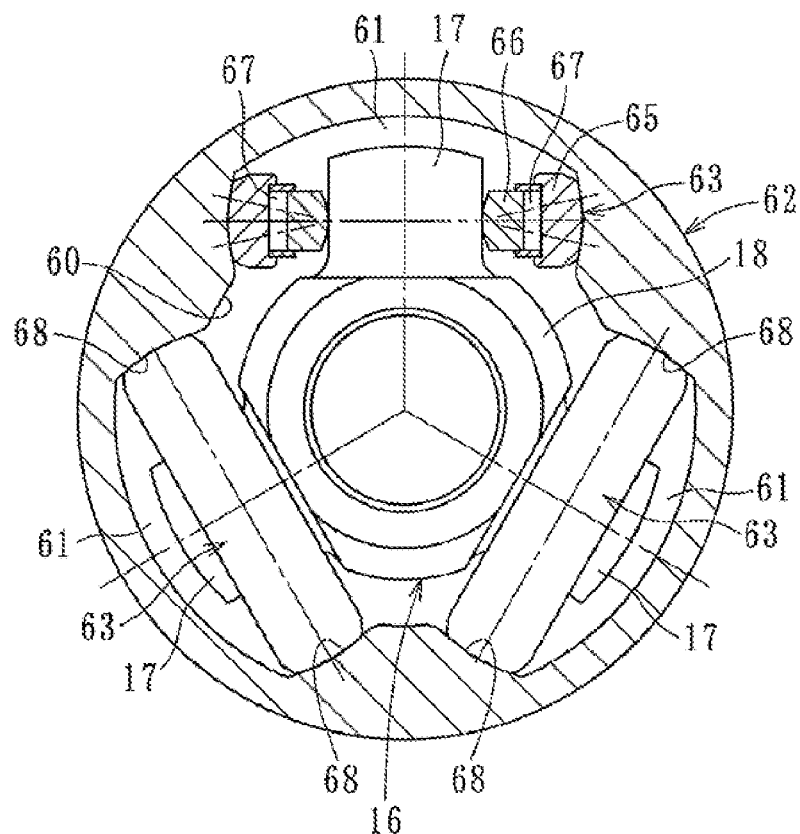
[FIG. 5] A sectional view of a tripod type constant velocity universal joint using a tripod member molded with the full-enclosed forging die.

FIG. 5 illustrates a tripod type constant velocity universal joint using the tripod member 16 molded by a forging method using the full-enclosed forging die according to the present invention. The tripod type constant velocity universal joint includes: an outer joint member 62 having an inner peripheral surface 60 provided with three linear track grooves 61 extending in the axial direction; the tripod member 16 arranged in the outer joint member 62 and including the three leg shafts (shaft portions) 17 protruded radially from the boss portion 18 and the radially outer surface of the boss portion 18; and torque transmitting elements 63 supported respectively by the leg shafts 17 and guided respectively by the track grooves 61. Each of the track grooves 61 has roller-guide surfaces 68 respectively formed on side walls facing each other in a circumferential direction.

Each of the torque transmitting elements 63 includes an outer roller 65 inserted into the track groove 61 of the outer joint member 62 and an inner roller 66 externally fitted to the leg shaft 17 so as to be arranged on an inner peripheral side of the outer roller 65. In this case, a plurality of rolling elements 67 are interposed between the outer roller 65 and the inner roller 66.

Figure 6:
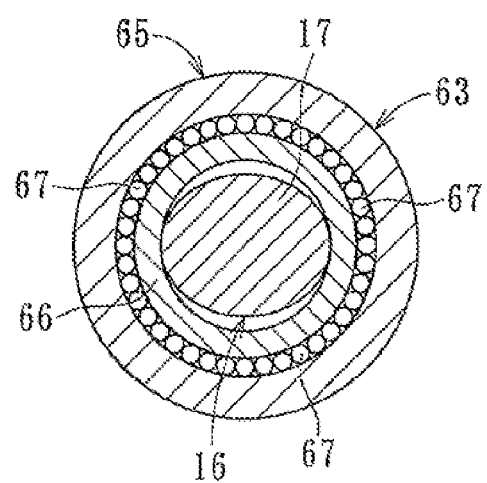
[FIG. 6] A sectional view of a torque transmitting element of the constant velocity universal joint.
Figure 7:
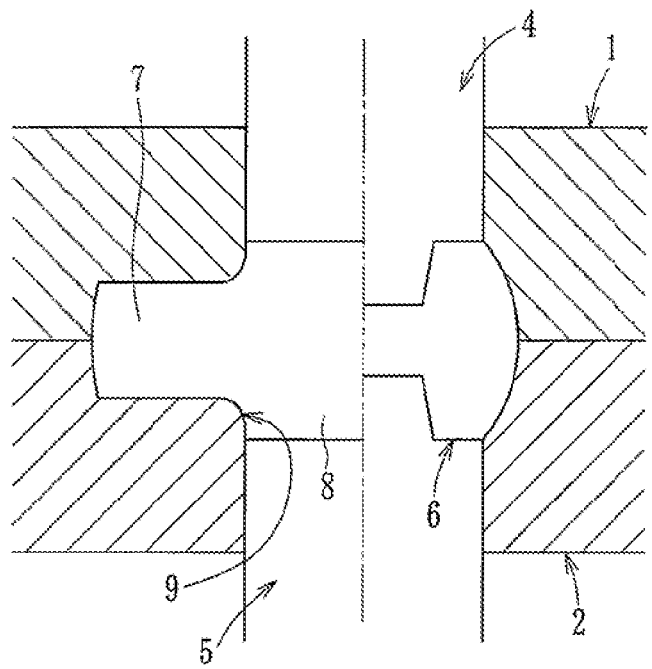
[FIG. 7] A sectional view of a conventional full-enclosed forging die.
Figure 8:
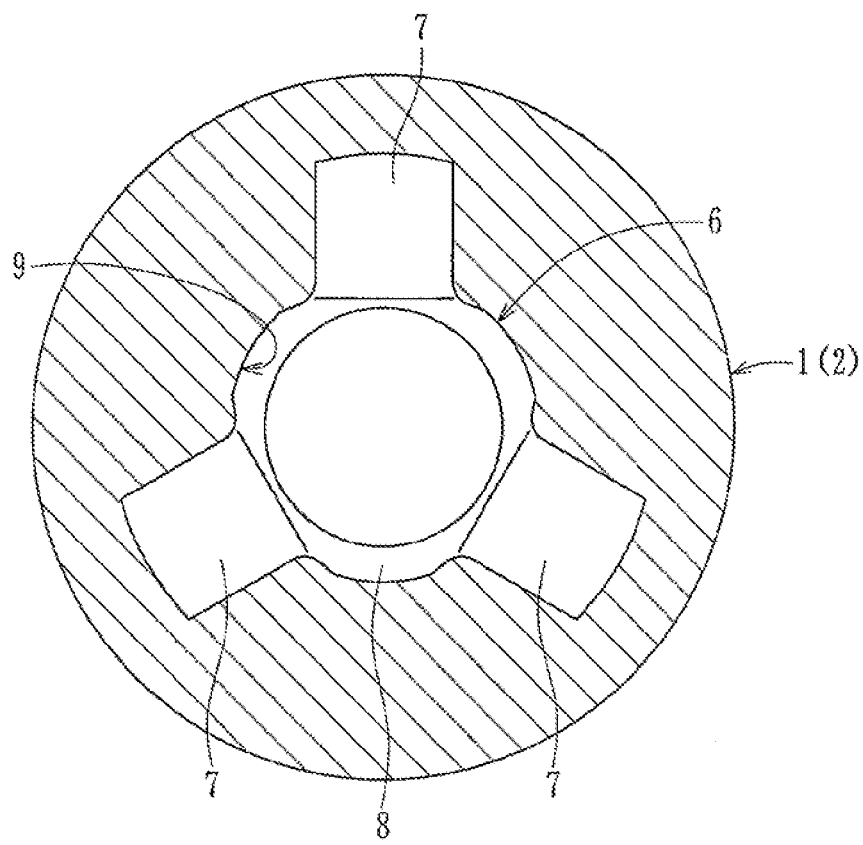
[FIG. 8] A sectional plan view of the conventional full-enclosed forging die.

Further, each the leg shafts 17 has such a straight shape as to be orthogonal to an axial line of the joint in vertical cross-section, and as illustrated in FIG. 6, is held in contact with an inner peripheral surface of the inner roller 66 in a direction orthogonal to the axial line of the joint in lateral cross-section. In addition, in the axial direction of the joint, a gap is formed between the leg shaft 17 and the inner peripheral surface of the inner roller 66. That is, in a sectional shape of the leg shaft 17, surfaces facing each other in the axial direction of the tripod member 16 retract into mutual directions, that is, to a radially inner side relative to an imaginary cylindrical surface.

With this structure, without loss of torque transmitting property, the roller 65 and the roller-guide surfaces 68 can be effectively avoided from entering an oblique state when rotation is made while the outer joint member 62 and the joint inner member (tripod member) 16 form an operating angle. As a result, skid resistance during operating-angle driving can be reduced. Thus, in vehicles using such constant velocity universal joints, it is possible to suppress phenomena such as vehicle-body vibration and noise which are caused by an increase in friction, and hence to maintain stable vibration property of the vehicles. Note that, the structure can be obtained, for example, through formation of a lateral sectional shape of the leg shaft 17 into such a substantially elliptical shape as to have a long axis in the direction orthogonal to the axial line of the joint.

Hereinabove, although description is made of the embodiment of the present invention, the present invention is not limited to the embodiment described above, and various modifications may be made thereto. For example, in the embodiment described above, the radially outer surface 30 of the boss portion 18 has such a shape as to have the first flat-surface portion 31, the convex curved-surface portion 32, the tapered-surface portion 33, the concave curved-surface portion 34, and the second flat-surface portion 35. However, the present invention is not limited to such a shape. That is, the first flat-surface portion 31, the tapered-surface portion 33, the concave curved-surface portion 34, the second flat-surface portion 35, and the like may be omitted. In this case, it is possible to omit only one of, all of, or arbitrary two of the first flat-surface portion 31, the tapered-surface portion 33, the concave curved-surface portion 34, and the second flat-surface portion 35. When the first flat-surface portion 31 is omitted, it suffices that the convex curved-surface portion 32 is formed up to an axial center of the radially outer surface. When the tapered-surface portion 33 is omitted, it suffices that the convex curved-surface portion 32 is extended up to the concave curved-surface portion 34. When the concave curved-surface portion 34 is omitted, it suffices that the convex curved-surface portion 32 is extended up to the second flat-surface portion 35 or the tapered-surface portion 33 is extended up to the second flat-surface portion 35.

Further, the dimension of the first flat-surface portion 31, the curvature radius of the convex curved-surface portion 32, the taper length L2 and the taper angle of the tapered-surface portion 33, the curvature radius of the concave curved-surface portion 34, the dimension of the second flat-surface portion 35, and the like may be variously modified as long as the flat-surface portion 31, the convex curved-surface portion 32, the tapered-surface portion 33, the concave curved-surface portion 34, the second flat-surface portion 35, and the like are smoothly continuous with each other and the above-mentioned projection area can be reduced. Still further, the leg shaft 17 may have a circular sectional shape.

EXAMPLE 1

Next, an examination was made on an enclosing force applied on the dies 11 and 12 of the full-enclosed forging die, and Table 1 below shows the results of the examination. In Table 1, "taper angle" represents the taper angle of the tapered-surface portion 33. Further, the thickness H of the boss portion 18 was set to 28 mm, the curvature radius R1 of the convex curved-surface portion 32 was set to 22 mm, the dimension L1 of the first flat-surface portion 31 was set to 0 mm, the dimension L2 of the tapered-surface portion 33 was set to 12.1 mm at a taper angle of 5°, 8.6 mm at a taper angle of 15°, and 5.2 mm at a taper angle of 25°, the curvature radius R2 of the concave curved-surface portion 34 was set to 0 mm, and the dimension L3 of the second flat-surface portion 35 was set to 0 mm.

TABLE 1

| Taper angle ∠α | Enclosing force |
| --- | --- |
| 5° | 42% |
| 15° | 25% |
| 25° | 11% |

Table 1 shows that, in comparison with a conventional product (as illustrated by the imaginary line in FIG. 2, the radially outer surface is constituted by the single curved surface about the boss-portion axial center), the enclosing force was successfully reduced by 42% at the taper angle α of 5°, by 25% at the taper angle α of 15°, and by 11% at the taper angle α of 25°. In this manner, when the projection area is reduced in the boss-portion axial direction toward the die side of the boss portion 18, the enclosing force can be reduced.

Industrial Applicability

The present invention is used for a forging method of forming a product including a boss portion radially provided with shaft portions, such as a trunnion (tripod member) for constant velocity universal joints and a cross spider for universal joints.

REFERENCE SIGNS LIST 11, 12 die
14, 15 punch
16 product (tripod member)
17 shaft portion (leg shaft)
18 boss portion
24 cavity
30 radially outer surface
31 flat-surface portion
32 convex curved-surface portion
33 tapered-surface portion
34 concave curved-surface portion
60 inner peripheral surface
61 track groove
62 outer joint member
63 torque transmitting element
65 outer roller
66 inner roller

The invention claimed is:

1. A tripod type constant velocity universal joint comprising:
   an outer joint member having an inner peripheral surface provided with three linear track grooves extending in an axial direction;
   a tripod member arranged in the outer joint member and including a boss portion and three leg shafts protruding from a radially outer surface of the boss portion; and
   a plurality of torque transmitting elements supported respectively by the three leg shafts and guided respectively by the three linear track grooves, the tripod member being molded with a full-enclosed forging die including a plurality of openable/closable dies and a plurality of punches for pressing a material between the openable/closable dies,
   wherein the radially outer surface of the boss portion of the tripod member comprises, from an axial central portion to each of opposite end surfaces, a first flat-surface portion, a convex curved-surface portion, a tapered-surface portion, a concave curved-surface portion, and a second flat-surface portion, the tapered-surface portion being tangential with respect to the convex curved-surface portion, a taper angle of the tapered-surface portion being set to 25° or less, the tapered-surface portion being tangential with respect to the concave curved-surface portion, the first flat-surface portion being tangential with respect to the convex curved-surface portion and being parallel to an axial direction, and the second flat-surface portion being tangential with respect to the concave curved-surface portion and being parallel to the axial direction, and
   wherein a projection area of an entire periphery in a peripheral direction of a projection portion of the radially outer surface of the boss portion on a plane including either of the opposite end surfaces of the boss portion is smaller than if the radially outer surface was formed as a single convex curved surface about a boss-portion axial center.

2. A tripod type constant velocity universal joint according to claim 1,
   wherein each of the torque transmitting elements comprises:
      an outer roller inserted into a corresponding one of the three linear track grooves of the outer joint member; and
      an inner roller externally fitted to a corresponding one of the three leg shafts so as to be arranged on an inner peripheral side of the outer roller,
   wherein each of the three leg shafts has a straight shape so as to be orthogonal to an axial line of the tripod type constant velocity universal joint in vertical cross-section, and is held in contact with an inner peripheral surface of the respective inner roller in a direction orthogonal to the axial line of the tripod type constant velocity universal joint in lateral cross-section, and
   wherein, in an axial-line direction of the tripod type constant velocity universal joint, a gap is formed between each of the three leg shafts and the inner peripheral surface of the respective inner roller.

3. A tripod type constant velocity universal joint according to claim 2, wherein a lateral sectional shape of each of the three leg shafts is a substantially elliptical shape.

4. A forging method for forming a product with a full-enclosed forging die including a plurality of openable/closable dies and a plurality of punches for pressing a material between the openable/closable dies, the forging method comprising:
   pressing the material between the openable/closable dies with the punches to mold the product including a boss portion and a plurality of shaft portions protruding radially from the boss portion,
   wherein a radially outer surface of the boss portion comprises, from an axial central portion to each of opposite end surfaces, a first flat-surface portion, a convex curved-surface portion, a tapered-surface portion, a concave curved-surface portion, and a second flat-surface portion, the tapered-surface portion being tangential with respect to the convex curved-surface portion, a taper angle of the tapered-surface portion being set to 25° or less, the tapered-surface portion being tangential with respect to the concave curved-surface portion, the first flat-surface portion being tangential with respect to the convex curved-surface portion and being parallel to an axial direction, and the second flat-surface portion being tangential with respect to the concave curved-surface portion and being parallel to the axial direction, and
   wherein a projection area of an entire periphery in a peripheral direction of a projection portion of the radially outer surface of the boss portion on a plane including either of the opposite end surfaces of the boss portion is smaller than if the radially outer surface was formed as a single convex curved surface about a boss-portion axial center.

5. A full-enclosed die comprising:
   a plurality of openable/closable dies; and
   a plurality of punches for pressing a material between the openable/closable dies so that a product including a boss portion and a plurality of shaft portions protruding radially from the boss portion is molded,
   wherein, in the boss portion of the product, a radially outer surface of the boss portion comprises, from an axial central portion to each of opposite end surfaces, a first flat-surface portion, a convex curved-surface portion, a tapered-surface portion, a concave curved-surface portion, and a second flat-surface portion, the tapered-surface portion being tangential with respect to the convex curved-surface portion, a taper angle of the tapered-surface portion being set to 25° or less, the tapered-surface portion being tangential with respect to the concave curved-surface portion, the first flat-surface portion being tangential with respect to the convex curved-surface portion and being parallel to an axial direction, and the second flat-surface portion being tangential with respect to the concave curved-surface portion and being parallel to the axial direction, and
   wherein a projection area of an entire periphery in a peripheral direction of a projection portion of the radially outer surface of the boss portion on a plane including either of the opposite end surfaces of the boss portion is smaller than if the radially outer surface was formed as a single convex curved surface about a boss-portion axial center.

* * * * *